(12) United States Patent
Hamazaki (10) Patent No.: US 12,007,257 B2
(45) Date of Patent: Jun. 11, 2024

(54) RESOLVER

(71) Applicant: MABUCHI MOTOR CO., LTD., Chiba (JP)

(72) Inventor: Kohei Hamazaki, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 18/256,424

(22) PCT Filed: Dec. 10, 2021

(86) PCT No.: PCT/JP2021/045686
§ 371 (c)(1),
(2) Date: Jun. 8, 2023

(87) PCT Pub. No.: WO2022/124414
PCT Pub. Date: Jun. 16, 2022

(65) Prior Publication Data
US 2024/0035856 A1    Feb. 1, 2024

(30) Foreign Application Priority Data

Dec. 11, 2020    (JP) .................................. 2020-205914

(51) Int. Cl.
*G01D 5/20*        (2006.01)
*G01B 7/30*        (2006.01)

(52) U.S. Cl.
CPC .................................... *G01D 5/20* (2013.01); *G01B 7/30* (2013.01)

(58) Field of Classification Search
CPC .................................... G01D 5/20; G01B 7/30
See application file for complete search history.

(56) References Cited

U.S. PATENT DOCUMENTS

| 2010/0321007 | A1 | 12/2010 | Fukuda et al. | |
| 2015/0042322 | A1* | 2/2015 | Otobe | G01D 5/2046 324/207.25 |
| 2017/0284833 | A1* | 10/2017 | Abe | H02K 3/18 |
| 2019/0331541 | A1 | 10/2019 | Janisch et al. | |

FOREIGN PATENT DOCUMENTS

| JP | H08292066 A | 11/1996 |
| JP | 5342963 B2 | 11/2013 |
| WO | 2018108783 A2 | 6/2018 |

OTHER PUBLICATIONS

International Search Report in PCT Application No. PCT/JP2021/045686 dated Mar. 1, 2022, 5pp.
Written Opinion in PCT Application No. PCT/JP2021/045686 dated Mar. 1, 2022, 8pp.

* cited by examiner

*Primary Examiner* — Reena Aurora
(74) *Attorney, Agent, or Firm* — HAUPTMAN HAM, LLP (57) ABSTRACT

A resolver includes a sine coil and a cosine coil that transmit AC signals having phases of the electrical angle different from each other by 90 degrees in one of a sheet-like excitation coil and a sheet-like detection coil disposed at a rotor or a stator, and a counter coil or a conductor disposed to face the sine coil and the cosine coil in the other of the excitation coil and the detection coil. In addition, an area (S) of a portion where each of the sine coil and the cosine coil and the counter coil or the conductor overlap each other when viewed in the axial direction of the resolver changes into a sinusoidal shape as the rotor rotates.

6 Claims, 8 Drawing Sheets

RESOLVER

RELATED APPLICATIONS

The present application is a National Phase of International Application Number PCT/JP2021/045686 filed Dec. 10, 2021, which claims the benefit of priority from Japanese Patent Application No. 2020-205914, filed on Dec. 11, 2020.

TECHNICAL FIELD

The present invention relates to a resolver that detects a rotation angle of a rotor with respect to a stator.

BACKGROUND ART

In the related art, in a resolver that detects a rotation angle of a rotor with respect to a stator, there is known a structure in which two-phase sheet coils having a phase difference of 90 degrees in an electrical angle are disposed adjacent to each other in a circumferential direction. For example, a resolver having a structure in which two-phase detection coils (sin phase coil pattern, cos phase coil pattern) disposed to face a single-phase excitation coil are disposed on the identical plane is known. With such a structure, the distances of the two-phase detection coils to the excitation coil are substantially identical, and the angle detection accuracy can be improved (see Japanese Patent No. 5342963).

CITATION LIST

Patent Literature

Patent Literature 1: Japanese Patent No. 5342963

SUMMARY OF INVENTION

Technical Problem

When the two-phase detection coils are disposed adjacent to each other, the magnitude of the voltage induced in each detection coil when the rotor is rotated suddenly changes, and the shape of the signal waveform may be distorted (irregular). To solve such a problem, there is a method of gradually changing the magnitude of the voltage induced by changing the number of turns of the coil according to the rotation angle of the rotor. However, since the number of turns of the coil can only be changed in unit of natural numbers, the voltage induced in the detection coil changes stepwise, and it is difficult to smoothly adjust the signal waveform. In addition, the structure is complicated by increasing the number of turns of the coil, and it is difficult to reduce the size and weight of the resolver.

One object of the present invention is to provide a resolver that has been created in view of the above problems and can realize a good signal waveform with a simple configuration. It is to be noted that the present invention is not limited to this object, and it is another object of the present invention to achieve operational effects that are derived from each configuration illustrated in "Description of Embodiments" to be described later and cannot be obtained by conventional techniques.

Solution to Problem

A resolver according to the present disclosure is a resolver that detects a rotation angle of a rotor with respect to a stator, wherein the resolver includes a sine coil and a cosine coil that transmit AC signals having phases of the electrical angle different from each other by 90 degrees in one of a sheet-like excitation coil and a sheet-like detection coil disposed at the rotor or the stator, and a counter coil or a conductor disposed to face the sine coil and the cosine coil in the other of the excitation coil and the detection coil. The area of a portion where each of the sine coil and the cosine coil and the counter coil or the conductor overlap each other when viewed in the axial direction of the resolver changes into a sinusoidal shape as the rotor rotates.

Advantageous Effects of Invention

According to the resolver of the disclosure, a good signal waveform can be realized with a simple configuration.

DESCRIPTION OF EMBODIMENTS

1. First Embodiment

A. Configuration

(a) Outline

Figure 1:
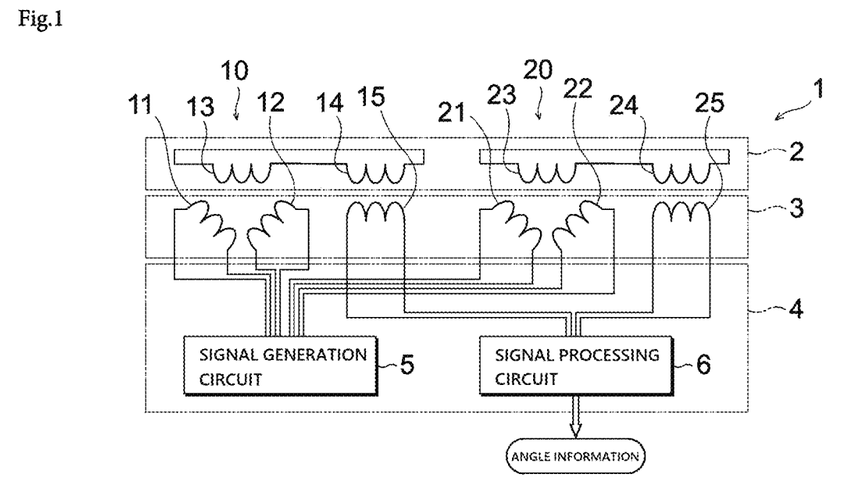
FIG. 1 is a schematic diagram illustrating a structure of a resolver as the first embodiment.

FIG. 1 is a schematic diagram illustrating a structure of a resolver 1 according to the first embodiment. The resolver 1 is a two-phase excitation single-phase output resolver 1, and is a modulated wave resolver that receives an amplitude-modulated AC signal and detects a rotation angle from a phase-modulated signal using the amplitude-modulated AC signal. Resolver 1 includes a rotor 2 (rotor), a stator 3

(stator), and a control device 4. The rotor 2 is a disk-shaped member rotatably supported by the stator 3. The stator 3 is a disk-shaped member fixed to a casing (not illustrated). Each of the rotor 2 and the stator 3 is provided with a plurality of sheet coils formed in a sheet shape.

The control device 4 calculates and outputs a rotation angle of the rotor 2 with respect to the stator 3. The control device 4 includes a signal generation circuit 5 that generates an AC signal supplied to the sheet coil, and a signal processing circuit 6 that outputs angle information corresponding to a rotation angle based on an output signal returned from the sheet coil. The AC signal generated by the signal generation circuit is transmitted from the stator 3 side to the rotor 2 side by electromagnetic induction, then returned from the rotor 2 side to the stator 3 side, and input to the signal processing circuit 6. The rotation angle of the rotor 2 with respect to the stator 3 is grasped based on the signal input to the signal processing circuit 6.

The rotor 2 and the stator 3 of the resolver 1 illustrated in FIG. 1 are provided with a first coil group 10 and a second coil group 20. The first coil group 10 is a coil group including an excitation coil and a detection coil having an axial double angle of nX. In other words, the excitation coil and the detection coil of the first coil group 10 are multipolar coils, and n pairs of magnetic poles (N pole and S pole) are formed. On the other hand, the second coil group 20 is a coil group including an excitation coil and a detection coil having an axial double angle of 1X. The number of magnetic pole pairs (N pole and S pole) in the excitation coil and the detection coil of the second coil group 20 is one on a plane where each coil exists.

By using both the signal returned to the signal processing circuit 6 via the first coil group 10 and the signal returned to the signal processing circuit 6 via the second coil group 20, it is possible to increase the angular resolution while identifying the rotation angle (absolute angle) of the rotor 2 with respect to the stator 3. Since the current flowing through the coil of the resolver 1 is an alternating current, the polarity (N pole, S pole) of the magnetic pole pair is inverted at a frequency corresponding to the frequency of the alternating current. Therefore, the polarity of the magnetic pole pair is not constantly fixed. In other words, there are a portion that functions as an N pole and a portion that functions as an S pole at a certain moment, and the polarity of each portion varies with time.

(b) The First Coil Group

The first coil group 10 includes a first sine excitation coil 11, a first cosine excitation coil 12, a first detection coil 13, a first transmission antenna coil 14, and a first reception antenna coil 15. Among these coils 11 to 15, axial double angles of at least the first sine excitation coil 11, the first cosine excitation coil 12, and the first detection coil 13 are set to nX. As illustrated in FIG. 1, the first sine excitation coil 11, the first cosine excitation coil 12, and the first reception antenna coil 15 are provided at the stator 3. The first detection coil 13 and the first transmission antenna coil 14 are provided at the rotor 2.

The first sine excitation coil 11 and the first cosine excitation coil 12 are sheet-like coils for inducing a voltage corresponding to the rotor angle to the first detection coil 13 of the rotor 2. When it is not necessary to distinguish them, they may be collectively referred to as first excitation coils 11, 12. AC signals having phases of the electrical angle different from each other by 90 degrees are input to each of the first excitation coils 11, 12. The AC signal is generated by the signal generation circuit 5 and then supplied to each of the first sine excitation coil 11 and the first cosine excitation coil 12. Specific examples of the AC signal include a modulated wave modulated so as to periodically increase or decrease the amplitude of a high frequency signal of several tens of kilohertz to several megahertz.

The first detection coil 13 (detection coil) is a sheet-like coil disposed at a position facing the first sine excitation coil 11 and the first cosine excitation coil 12 in the axial direction of the rotor 2 at the facing face at which the rotor 2 and the stator 3 face each other. A voltage is induced in the first detection coil 13 by interlinkage of magnetic fluxes generated by exciting the first sine excitation coil 11 and the first cosine excitation coil 12. The induced voltage and the excitation current (AC signal) generated in the first detection coil 13 also act on the first transmission antenna coil 14.

The first transmission antenna coil 14 is a winding (coil) for returning an AC signal generated in the first detection coil 13 to the stator 3 side, and is provided at the rotor 2. The first transmission antenna coil 14 has a closed circuit with both ends thereof connected to both ends of the first detection coil 13. In addition, the first transmission antenna coil 14 is formed in a shape in which the conductor is routed so as to spiral around the rotation axis C of the rotor 2, for example, inside the first detection coil 13.

The first reception antenna coil 15 is provided at the stator 3 and is disposed at a position facing the first transmission antenna coil 14 in the axial direction of the rotor 2. In addition, the first reception antenna coil 15 is formed in a shape in which the conductor is routed to spiral around the rotation axis C of the rotor 2 inside the first sine excitation coil 11 and the first cosine excitation coil 12, for example. The AC signal transmitted to the first reception antenna coil 15 is input to the signal processing circuit 6 and used for calculating the rotation angle of the rotor 2 with respect to the stator 3.

(c) The Second Coil Group

The second coil group 20 includes a second sine excitation coil 21, a second cosine excitation coil 22, a second detection coil 23, a second transmission antenna coil 24, and a second reception antenna coil 25. Among these coils 21 to 25, the axial double angle of at least the second sine excitation coil 21, the second cosine excitation coil 22, and the second detection coil 23 is set to 1X. As illustrated in FIG. 1, the second sine excitation coil 21, the second cosine excitation coil 22, and the second reception antenna coil 25 are provided at the stator 3. The second detection coil 23 and the second transmission antenna coil 24 are provided at the rotor 2.

The second sine excitation coil 21 and the second cosine excitation coil 22 (excitation coil) are sheet-like coils for inducing a voltage corresponding to the rotor angle to the second detection coil 23 of the rotor 2. When it is not necessary to distinguish them, they may be collectively referred to as second excitation coils 21, 22. An AC signal (an AC signal generated by the signal generation circuit 5) having phases of the electrical angle different from each other by 90 degrees is input to each of the second excitation coils 21, 22. The layout of the second excitation coils 21, 22 can conform to a petal shape having four rotational symmetries in an annular region in which a radius around the rotation axis C of the rotor 2 is sandwiched between an outer circle having a radius $r_1$ and an inner circle having a radius $r_2$.

Figure 2:
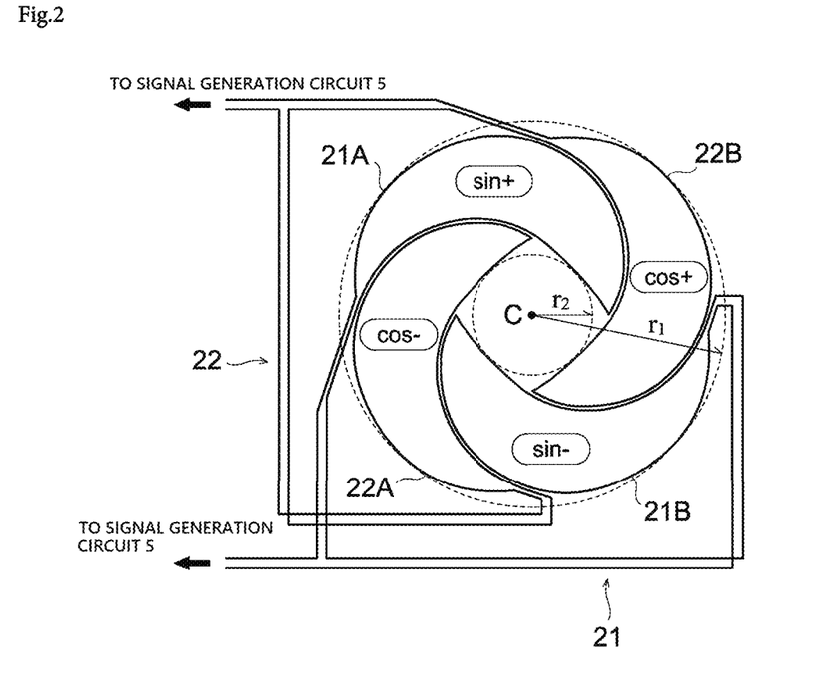
FIG. 2 is a schematic circuit diagram illustrating a structure of an excitation coil.

As illustrated in FIG. 2, the second sine excitation coil 21 is formed in a shape in which an outward coil 21A (sin+ in FIG. 2) for generating one of the magnetic pole pair (N pole and S pole) and a backward coil 21B (sin− in FIG. 2) for generating the other of the magnetic pole pair are linked. The outward coil 21A functions to generate a magnetic flux in a direction opposite to that of the backward coil 21B. For example, these coils 21A and 21B are connected such that a counterclockwise current flows through the backward coil 21B at the moment when a clockwise current flows through the outward coil 21A in FIG. 2. The outward coil 21A and the backward coil 21B are disposed on the identical plane so as not to overlap each other.

The second detection coil 23 (detection coil, counter coil) is a sheet-like coil disposed at a position facing the second sine excitation coil 21 and the second cosine excitation coil 22 in the axial direction of the rotor 2 at the facing face at which the rotor 2 and the stator 3 face each other. A voltage is induced in the second detection coil 23 by interlinkage of magnetic fluxes generated by exciting the second sine excitation coil 21 and the second cosine excitation coil 22. The induced voltage and the excitation current (AC signal) generated in the second detection coil 23 also act on the second transmission antenna coil 24. The entire shape of the second detection coil 23 is an annular shape coaxial with the rotation axis C of the rotor 2.

Figure 3:
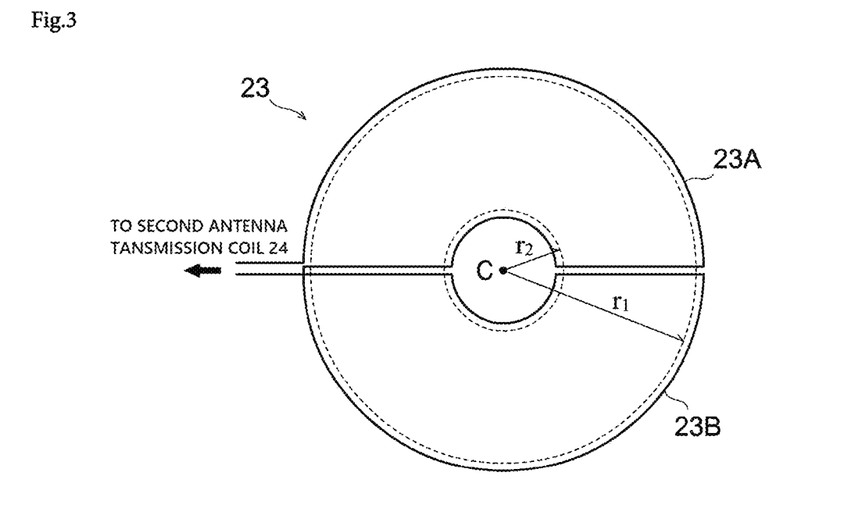
FIG. 3 is a schematic circuit diagram illustrating a structure of a detection coil.

In addition, the second detection coil 23 is formed in a shape in which the outward coil 23A and the backward coil 23B are linked. The shape is formed in a shape corresponding to each of the two sections obtained by dividing the annular region so that an induced voltage can be generated by receiving the magnetic flux of each of the outward coils 21A and 22A and the backward coils 21B and 22B. The winding direction of the outward coil 23A is set to a direction opposite to the winding direction of the backward coil 23B. The outward coil 23A and the backward coil 23B illustrated in FIG. 3 are formed in a shape corresponding to a semi-annular region obtained by dividing an annular region (donut type) sandwiched between an outer circle having a radius $r_1$ and an inner circle having a radius $r_2$ into two.

Area S of a portion where the second sine excitation coil 21 and the second cosine excitation coil 22 overlap the second detection coil 23 when viewed in the axial direction of the resolver 1 will be described in detail. The shapes of the second sine excitation coil 21, the second cosine excitation coil 22, and the second detection coil 23 are set such that the area S changes into a sinusoidal shape with the rotation of the rotor 2. In other words, the overlapping state of the second sine excitation coil 21 and the second cosine excitation coil 22, and the second detection coil 23 is set such that the area S of the overlapping portion changes into a sinusoidal shape with respect to the deflection angle θ in the polar coordinate plane with the rotation axis C of the rotor 2 as a reference. The term "sinusoidal shape" as used herein means that when the relationship of the area S with respect to the deflection angle θ is expressed by a graph, the graph has a shape corresponding to part of the sine wave, and may be referred to as a "cosine wave shape".

Specific examples of the portion where the second sine excitation coil 21 and the second detection coil 23 overlap include a portion where the outward coil 21A and the outward coil 23A overlap, a portion where the outward coil 21A and the backward coil 23B overlap, a portion where the backward coil 21B and the outward coil 23A overlap, and a portion where the backward coil 21B and the backward coil 23B overlap. Similarly, specific examples of the portion where the second cosine excitation coil 22 and the second detection coil 23 overlap include a portion where the outward coil 22A and the outward coil 23A overlap, a portion where the outward coil 22A and the backward coil 23B overlap, a portion where the backward coil 22B and the outward coil 23A overlap, and a portion where the backward coil 22B and the backward coil 23B overlap. The area S of each overlapping portion changes into a sinusoidal shape with the rotation of the rotor 2.

In addition, each of the outward coil 21A and the backward coil 21B is formed in a shape that changes the radial width f(θ) into a sinusoidal shape with respect to the deflection angle θ in a polar coordinate plane with the rotation axis C of the rotor 2 as a reference. For example, the shape of the outward coil 21A is formed in a shape corresponding to the "sin+ region" located within the range of 0≤θ≤π in the polar coordinate graph illustrated in FIG. 4A. In addition, the shape of the backward coil 21B is formed in a shape corresponding to the "sin− region" located within the range of π≤θ≤2π. The "sin− region" is identical to that obtained by moving the "sin+ region" in FIG. 4A by π in the horizontal direction, and these have substantially the identical shape.

Figure 5:
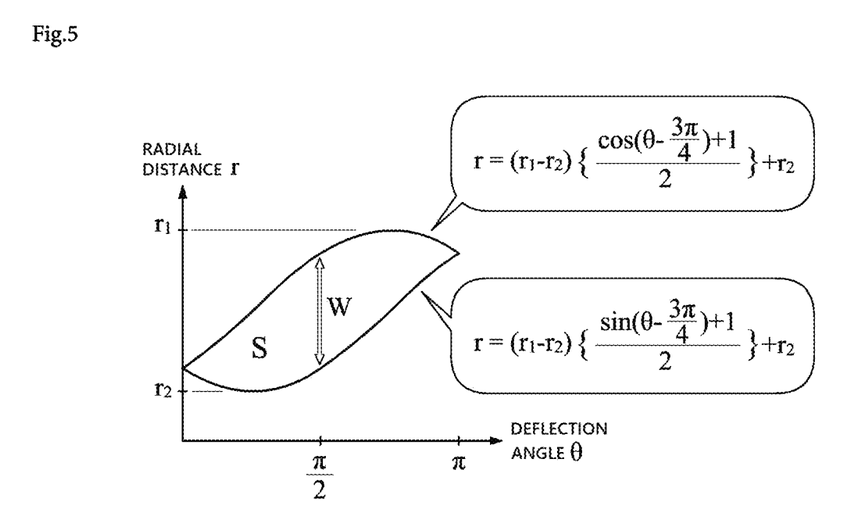
FIG. 5 is a graph for describing a shape of an excitation coil by a mathematical expression.
Figure 6A:
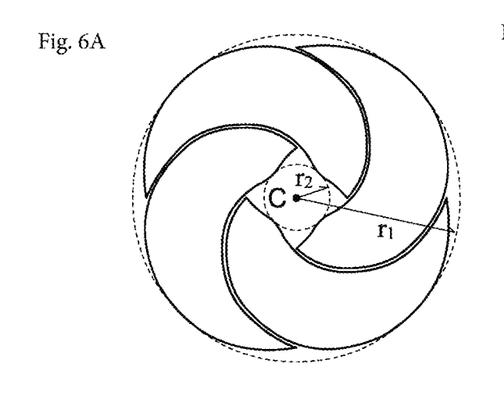
FIGS. 6A to 6D are schematic diagrams for describing a specific example of an excitation coil.
Figure 6B:
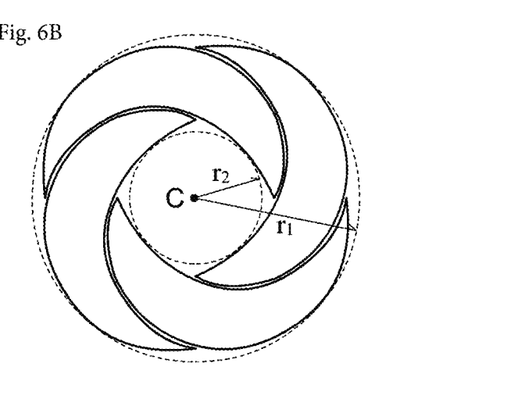
Figure 6C:
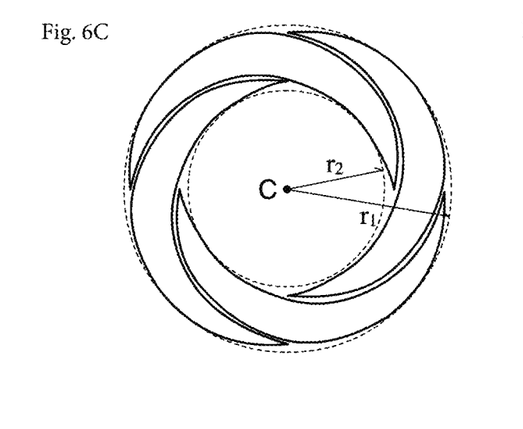
Figure 6D:
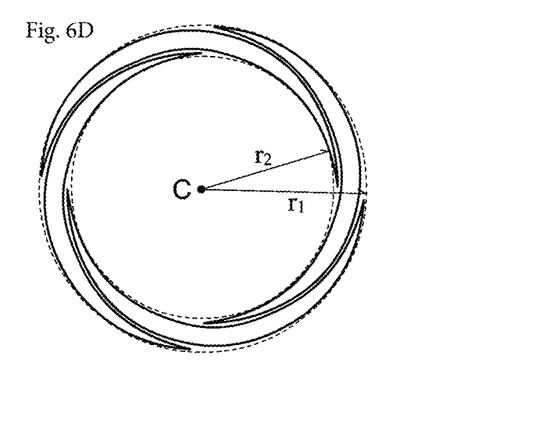

Here, the shape of the "sin+ region" will be described in detail with reference to FIG. 5. A curve corresponding to the upper end side of the "sin+" region illustrated in FIG. 5 is expressed by the following Expression 1 in a polar coordinate plane with the rotation axis C of the rotor 2 as a reference. A curve corresponding to the lower end side is expressed by the following Expression 2. Further, the radial width f(θ) of the "sin+" region can be expressed as a difference between Expression 1 and Expression 2, and is expressed by the following Expression 3. The shape of the second detection coil 23 is expressed by the following Expression 4. The area S is an overlapping area in Expression 3 and Expression 4, and is represented by the convolution integral shown in Expression 5. The area S of a portion where the second sine excitation coil 21 and the second detection coil 23 overlap each other changes in a sinusoidal shape (cosine wave shape).

[Math 1]

$$r = (r_1 - r_2)\left\{\frac{\cos\left(\theta - \frac{3}{4}\pi\right) + 1}{2}\right\} + r_2,\ 0 \le \theta \le \pi \quad \text{Expression 1}$$

$$r = (r_1 - r_2)\left\{\frac{\sin\left(\theta - \frac{3}{4}\pi\right) + 1}{2}\right\} + r_2,\ 0 \le \theta \le \pi \quad \text{Expression 2}$$

$$f(\theta) = \frac{\sqrt{2}(r_1 - r_2)}{2}\sin\theta,\ 0 \le \theta \le \pi \quad \text{Expression 3}$$

$$g(\theta - \varphi) = \begin{cases} r_1 - r_2, & \theta \le \varphi < \theta + \pi \\ -(r_1 - r_2), & \theta + \pi \le \theta < \theta + 2\pi \end{cases} \quad \text{Expression 4}$$

Expression 5

$$S = \int_0^{2\pi} f(\varphi)g(\theta - \varphi)d\varphi = \int_0^\theta \frac{\sqrt{2}(r_1 - r_2)}{2}\sin\varphi(-(r_1 - r_2))d\varphi +$$

$$\int_\theta^\pi \frac{\sqrt{2}(r_1 - r_2)}{2}\sin\varphi(r_1 - r_2)d\varphi +$$

$$\int_\pi^{\theta+\pi} \frac{\sqrt{2}(r_1 - r_2)}{2}\sin\varphi(r_1 - r_2)d\varphi +$$

-continued $$\int_{\theta+\pi}^{2\pi} \frac{\sqrt{2}(r_1-r_2)}{2}\sin\varphi(-(r_1-r_2))d\varphi =$$

$$\frac{\sqrt{2}(r_1-r_2)^2}{2}\{(\cos\theta-1)+(1+\cos\theta)+$$

$$(-\cos(\theta+\pi)-1)+(1-\cos(\theta+\pi))\} = 2\sqrt{2}(r_1-r_2)^2\cos\theta$$

$r_1$: Outer diameter, $r_2$: Inner diameter, r: Distance from origin, θ: Deflection angle,
W: Radial width, S: Area In Expressions 1 to 5, $r_1$ is the radius of the circumscribed circle (circle in contact with the second sine excitation coil 21 outside the second sine excitation coil 21 in circle whose center is rotation axis C) of the second sine excitation coil 21, and is the dimension corresponding to the outer diameter of the second sine excitation coil 21. In Expressions 1 to 5, $r_2$ is the radius of the inscribed circle (circle in contact with second sine excitation coil 21 the inside second sine excitation coil 21 in circle whose center is rotation axis C) of the second sine excitation coil 21, and is the dimension corresponding to the inner diameter of the second sine excitation coil 21.

The same applies to the second cosine excitation coil 22. As illustrated in FIG. 2, second cosine excitation coil 22 is formed into a shape in which the outward coil 22A (cos− in FIG. 2) and the backward coil 22B (cos+ in FIG. 2) are linked. The outward coil 22A functions to generate a magnetic flux in a direction opposite to that of the backward coil 22B. In addition, the outward coil 22A and the backward coil 22B are disposed on the identical plane so as not to overlap each other. Further, each of the outward coil 22A and the backward coil 22B is formed in a shape in which the radial width W is changed into a sinusoidal shape with respect to the deflection angle θ in a polar coordinate plane with the rotation axis C of the rotor 2 as a reference, and is also formed in a shape in which the area S of the portion overlapping the second detection coil 23 is also changed into a sinusoidal shape.

Figure 4A:
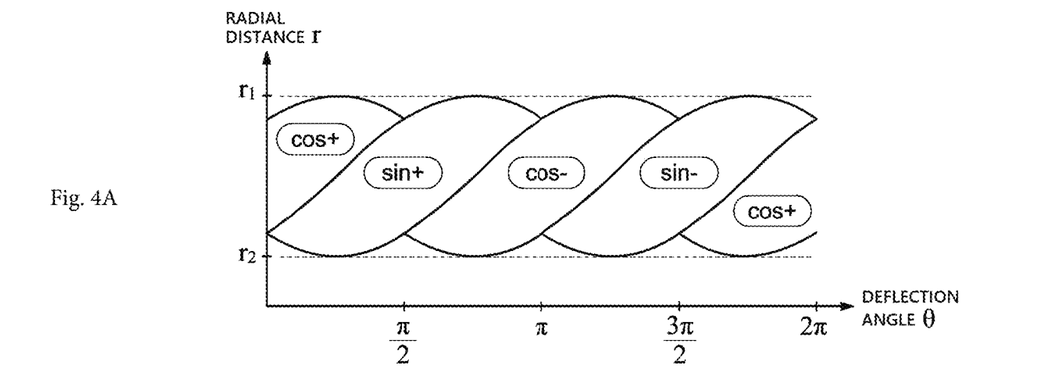
FIG. 4A is a graph illustrating a shape of an excitation coil in polar coordinates.

For example, the shape of the outward coil 22A is formed in a shape corresponding to a "cos− region" located within a range of $\pi/2 \leq \theta \leq 3\pi/2$ in the polar coordinate graph illustrated in FIG. 4A. In addition, the shape of the backward coil 22B is formed in a shape corresponding to the "cos+ region" located within the range of $3\pi/2 \leq \theta \leq 5\pi/2$. The "cos− region" is identical to that obtained by horizontally moving the "sin+ region" in FIG. 4A by $\pi/2$, and these have substantially the identical shape.

As illustrated in FIG. 2, in the resolver 1 of the first embodiment, the outward coils 21A, 22A and the backward coils 21B, 22B are disposed so as to be adjacent to each other without a gap in the radial direction. For example, the radial gap between the outward coil 21A of the second sine excitation coil 21 and the backward coil 22B of the second cosine excitation coil 22 at the adjacent positions is narrow within a range where insulation can be secured and manufacturing is possible. The radial gap between the backward coil 22B of the second cosine excitation coil 22 and the backward coil 21B of the second sine excitation coil 21 at the adjacent position is also narrow within a range where insulation can be secured and manufacturing is possible.

Similarly, there is substantially no gap between the backward coil 21B of the second sine excitation coil 21 and the outward coil 22A of the second cosine excitation coil 22 at the adjacent position, and there is substantially no gap between the outward coil 22A of the second cosine excitation coil 22 and the outward coil 21A of the second sine excitation coil 21 at the adjacent position. As described above, by eliminating the gap between second excitation coils 21, 22, the area of the region where the magnetic flux is generated is increased as compared with the case where there is a gap, and the signal transmission efficiency to the second detection coil 23 is improved.

With respect to the radial gap between the outward coils 21A and 22A and the backward coils 21B and 22B at the adjacent position, in order to maximize the area of the region where the magnetic flux is generated, it is conceivable to set the gap dimension as small as possible. On the other hand, it is also important to secure a predetermined gap dimension in consideration of pattern formation accuracy of the conductor, construction accuracy, and the like.

The shape of the outward coil 23A is formed so as to correspond to a quadrangle that covers a range of $r_2 \leq r \leq r_1$ in a range of $0 \leq \theta \leq \pi$ in a polar coordinate plane with the rotation axis C of the rotor 2 as a reference. Alternatively, it is formed in a shape corresponding to a quadrangle slightly larger than the quadrangle. For example, in the polar coordinate graph shown in FIG. 4B, the shape of the outward coil 23A is set so as to correspond to a quadrangle that covers a range of $r_2-a \leq r \leq r_1+a$ (a is a predetermined value) in a range of $0 \leq \theta \leq \pi$. Similarly, the shape of the backward coil 23B is formed in a shape corresponding to a quadrangle that covers a range of $r_2-a \leq r \leq r_1+a$ in a range of $\pi \leq \theta \leq 2\pi$ in the polar coordinate graph illustrated in FIG. 4B.

The second transmission antenna coil 24 is a winding (coil) for returning the AC signal generated in the second detection coil 23 to the stator 3 side, and is provided at the rotor 2. The second transmission antenna coil 24 has a closed circuit with both ends thereof connected to both ends of the second detection coil 23 to form. In addition, the second transmission antenna coil 24 is formed in a shape in which the conductor is routed so as to spiral around the rotation axis C of the rotor 2 inside the second detection coil 23, for example.

B. Action and Effect (1) In the resolver 1, the area S of a portion where each of the second sine excitation coil 21 and the second cosine excitation coil 22 and the second detection coil 23 overlap each other is formed to change into a sinusoidal shape with the rotation of the rotor 2. With such coil setting, it is possible to continuously (smoothly) vary the area of the magnetic flux responsible for signal transmission from the second excitation coils 21, 22 to the second detection coil 23, and it is possible to make the waveform of the AC signal generated in the second detection coil 23 a smooth curved shape. Therefore, a good signal waveform can be realized with a simple configuration.

Figure 4B:
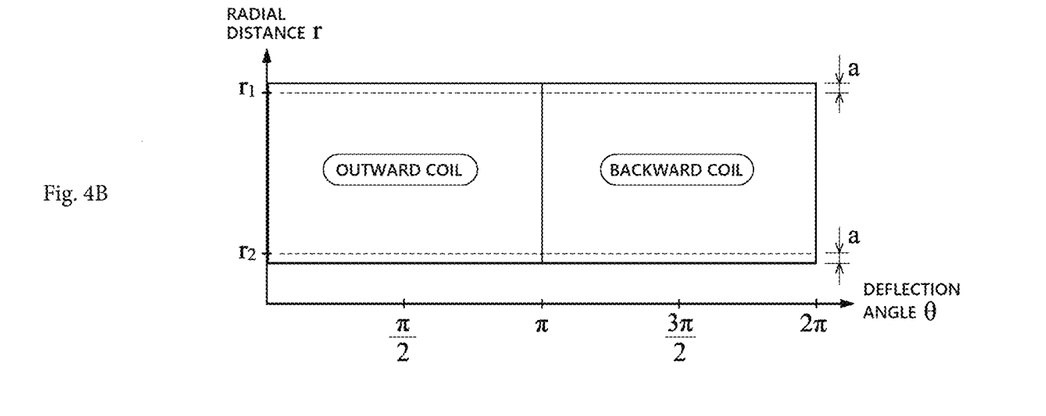
FIG. 4B is a graph illustrating a shape of a detection coil in polar coordinates.

(2) In the resolver 1, each of the second sine excitation coil 21 and the second cosine excitation coil 22 has a shape that changes the radial width W into a sinusoidal shape with respect to deflection angle θ in a polar coordinate plane with the rotation axis C of the rotor 2 as a reference. By setting such a shape, it is possible to easily realize a structure in which the area S of the overlapping portion with the second detection coil 23 changes into a sinusoidal shape. In addition, even when the shape of the second detection coil 23 is simple, the area S can be changed in a sinusoidal shape. For example, as illustrated in FIG. 4B, by using the second detection coil 23 having a certain radial width or more, the area S can be changed into a sinusoidal shape, and a good signal waveform can be realized.

(3) In the resolver 1, the second detection coil 23 is formed in an annular shape coaxial with the rotation axis of the rotor. By using such a second detection coil 23, it is possible to realize a good signal waveform with a simple shape and secure performance. In addition, since the structure of second detection coil 23 is simple, the cost and labor for manufacturing the resolver 1 can be reduced.

(4) In the second sine excitation coil 21, the outward coil 21A and the backward coil 21B are disposed on the identical plane so as not to overlap each other. In the second cosine excitation coil 22, the outward coil 22A and the backward coil 22B are disposed on the identical plane so as not to overlap each other. With such a structure, the distance to the second detection coil 23 can be made identical for each of the outward coils 21A and 22A and the backward coils 21B and 22B, and the signal intensities can be made uniform. Therefore, a good signal waveform can be realized with a simple configuration. In addition, the outward coils 21A and 22A and the backward coils 21B and 22B can be formed in the identical layer, and the structure of the second sine excitation coil 21 can be simplified (reduced in thickness).

(5) In the resolver 1, the outward coils 21A, 22A and the backward coils 21B, 22B are disposed so as to be adjacent to each other without a gap in the radial direction. As described above, by adopting the layout without the gap between the second excitation coils 21, 22, the area of the region where the magnetic flux is generated can be increased as compared with the case where there is a gap, and the signal transmission efficiency to the second detection coil 23 can be improved. Further, by making the dimension of the gap constant, it is possible to suppress the disturbance of the signal while maximizing the area of the region where the magnetic flux is generated in each of the outward coils 21A and 22A and the backward coils 21B and 22B, and it is possible to realize a good signal waveform with a simple configuration.

(6) In the resolver 1, each of the second sine excitation coil 21 (outward coil 21A and backward coil 21B) and the second cosine excitation coil 22 (outward coil 22A and backward coil 22B) is formed into the shape corresponding to the region surrounded by the curve expressed by Expressions 1 and 2. With such a configuration, it is possible to easily form a shape in which the radial width W changes into a sinusoidal shape and the boundary line with the adjacent coil is a smooth curved shape. Therefore, a good signal waveform can be realized with a simple configuration.

C. Modifications

The first embodiment described above is merely an example, and there is no intention to exclude application of various modifications and techniques that are not explicitly described in the present embodiment. Each configuration of the present embodiment can be variously modified and implemented without departing from the spirit thereof. In addition, each configuration of the present embodiment can be selected as necessary, or can be appropriately combined with various configurations included in the known technology.

In the above embodiment, the coil patterns of the second excitation coils 21, 22 are formed in a petal shape as illustrated in FIG. 2, but the specific coil pattern is not limited thereto. FIGS. 6A to 6D are schematic diagrams illustrating coil patterns when the ratio between the outer diameter $r_1$ and the inner diameter $r_2$ in Expressions 1 and 2 is changed. In any of the coil patterns, each of the second sine excitation coil 21 and the second cosine excitation coil 22 has a shape that changes the radial width W into a sinusoidal shape with respect to the deflection angle θ. Therefore, the waveform of the AC signal generated in the second detection coil 23 can be changed in a smooth curved shape, and a good signal waveform can be formed.

Figure 7A:
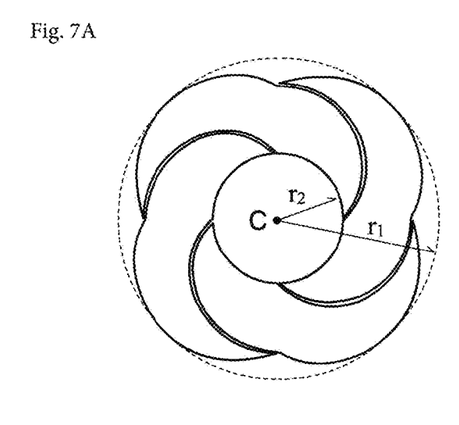
FIG. 7A is a schematic diagram for explaining a structure of an excitation coil as a modification.
Figure 7B:
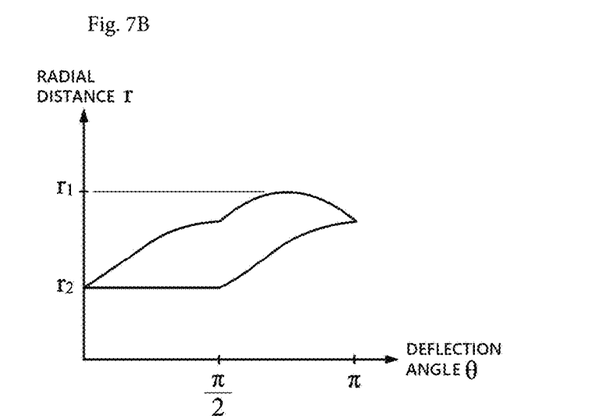
FIG. 7B is a graph in which a shape of the excitation coil is expressed by polar coordinates.

FIG. 7A is a schematic view illustrating a coil pattern in which the inside of each of the second excitation coils 21, 22 has a perfect circular shape, and FIG. 7B is a graph in which each coil shape is expressed by polar coordinates. The region illustrated in FIG. 7B is formed in a shape in which the radial width W changes into a sinusoidal shape with respect to the deflection angle θ. The line corresponding to the lower end side of the region shown in FIG. 7B, is linear in a range of $0 \leq \theta \leq \pi/2$, and is sinusoidal in a range of $\pi/2 \leq \theta \leq \pi$. Furthermore, the line corresponding to the upper end side of the region shown in FIG. 7B, is sinusoidal in a range of $0 \leq \theta \leq \pi/2$, and is a waveform shape in a range of $\pi/2 \leq \theta \leq \pi$, different from that in a range of $0 \leq \theta \leq \pi/2$ (corrugated shape obtained by combining two sinusoidal waves).

Even in such a coil pattern, a good signal waveform can be formed. However, lines corresponding to the upper end side and the lower end side surrounding the region illustrated in FIG. 7B have a pointed shape (inflection point) at θ=π/2, and the coil pattern is slightly distorted. In addition, when the rotation axis is shifted between the rotor 2 and the stator 3, the inflection point may cause noise generation. In view of such a point, coil patterns as shown in FIGS. 2 and 6A to 6D are more preferable than a coil pattern as shown in FIG. 7A.

Figure 8A:
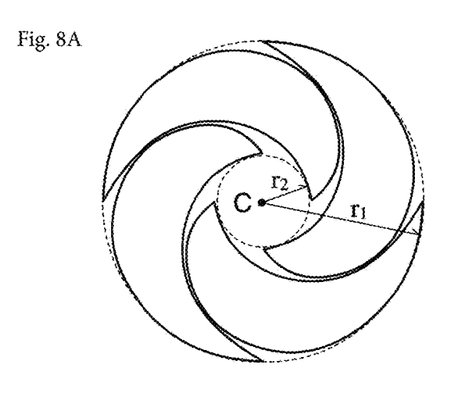
FIG. 8A is a schematic diagram for explaining a structure of an excitation coil as a modification.
Figure 8B:
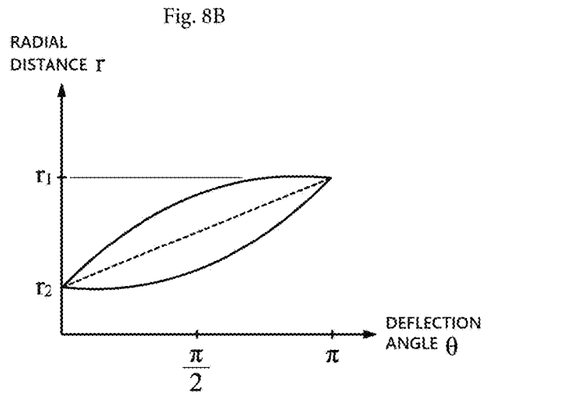
FIG. 8B is a graph in which a shape of the excitation coil is expressed by polar coordinates.

FIG. 8B is a graph illustrating a case where the coil shapes of the second excitation coils 21, 22 are formed into a shape in which a straight line (broken line) and a sine wave are combined in polar coordinates, and FIG. 8A is a schematic diagram illustrating the coil pattern. The region illustrated in FIG. 8B is formed in a shape in which the radial width W changes into a sinusoidal shape with respect to the deflection angle θ. Therefore, even in such a coil pattern, a good signal waveform can be formed. However, in the coil pattern illustrated in FIG. 8A, a gap is formed between the coils, and the signal transmission efficiency to the second detection coil 23 slightly decreases. In view of such a point, coil patterns as shown in FIGS. 2 and 6A to 6D is more preferable than a coil pattern as shown in FIG. 8A.

Figure 9:
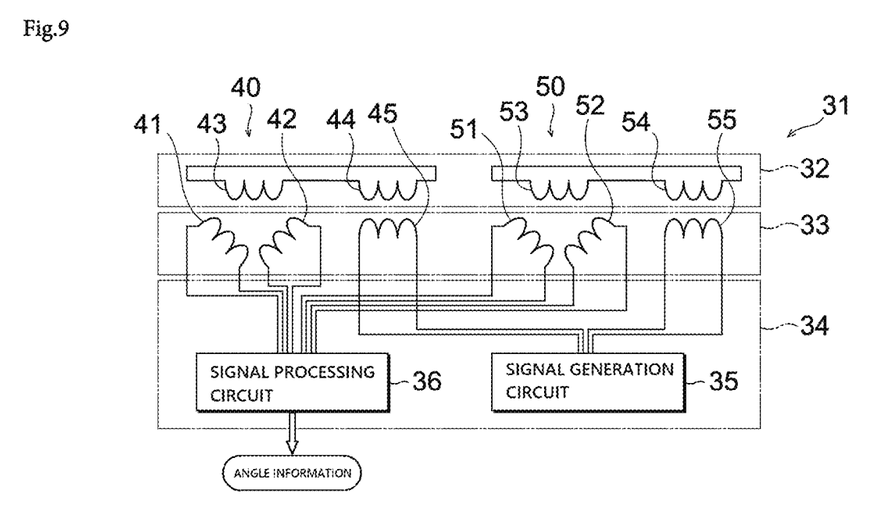
FIG. 9 is a schematic diagram illustrating a structure of a resolver as a modification.

Further, in the above embodiment, the two-phase excitation single-phase output resolver 1 is exemplified, but a similar structure may be applied to the single-phase excitation two-phase output resolver 31 as illustrated in FIG. 9. The resolver 31 is provided with a rotor 32, a stator 33, and a control device 34. The control device 34 incorporates a signal generation circuit 35 and a signal processing circuit 36. The rotor 32 and the stator 33 of the resolver 31 are provided with a first coil group 40 and a second coil group 50.

The first coil group 40 includes a first sine detection coil 41, a first cosine detection coil 42, a first excitation coil 43, a first reception antenna coil 44, and a first transmission antenna coil 45. Similarly, the second coil group 50 includes a second sine detection coil 51, a second cosine detection coil 52, a second excitation coil 53, a second reception antenna coil 54, and a second transmission antenna coil 55. Among the coils included in the coil groups 40 and 50, the axial double angles of the first sine detection coil 41, the first cosine detection coil 42, and the first excitation coil 43 are set to nX, and the axial double angles of the second sine detection coil 51, the second cosine detection coil 52, and the second excitation coil 53 are set to 1X.

The first excitation coil 43, the first reception antenna coil 44, the second excitation coil 53, and the second reception antenna coil 54 are provided at the rotor 32. On the other hand, the first sine detection coil 41, the first cosine detection coil 42, the first transmission antenna coil 45, the second sine detection coil 51, the second cosine detection coil 52, and the second transmission antenna coil 55 are provided at the stator 33. The AC signal generated by the signal generation circuit 35 is transmitted to the first transmission antenna coil 45 and the second transmission antenna coil 55, and then transmitted to the first reception antenna coil 44 and the second reception antenna coil 54.

The first excitation coil 43 and the second excitation coil 53 are excited by receiving the AC signal. Thereafter, the first sine detection coil 41, the first cosine detection coil 42, the second sine detection coil 51, and the second cosine detection coil 52 output an AC signal according to the rotation angle of the rotor 2 with respect to the stator 3, and the signal is transmitted to the signal processing circuit 36. The signal processing circuit 36 calculates the rotation angle of the rotor 2 with respect to the stator 3 using the AC signal obtained via the coils of the two systems in combination to output the angle information. In the resolver 31, each of the second sine detection coil 51 and the second cosine detection coil 52 may be formed into a shape in which the radial width is changed into a sinusoidal shape with respect to the deflection angle. Such a configuration brings about actions and effects similar to those of the above-described embodiment.

Figure 10A:
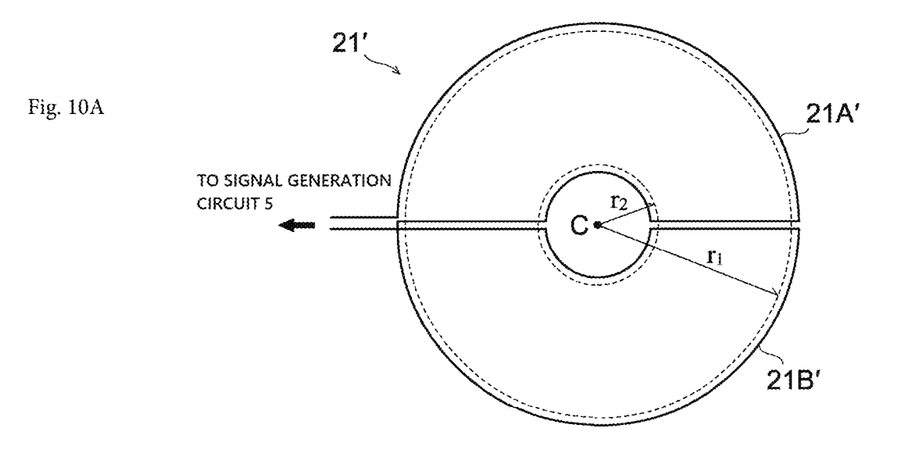
FIG. 10A is a schematic circuit diagram illustrating a structure of an excitation coil as a modification.

Further, in the above embodiment, the resolver 1 in which the second detection coil 23 of the rotor 2 is formed in the annular shape and the second excitation coils 21, 22 of the stator 3 are formed in the petal shape is exemplified, but these shapes may be reversed. For example, as illustrated in FIG. 10A, an excitation coil 21' of the stator 3 may be disposed in the annular region. The excitation coil 21' is formed in a shape in which an outward coil 21A' and a backward coil 21B' are linked. The shape is formed in a shape corresponding to each of the two sections obtained by dividing the annular region.

Figure 10B:
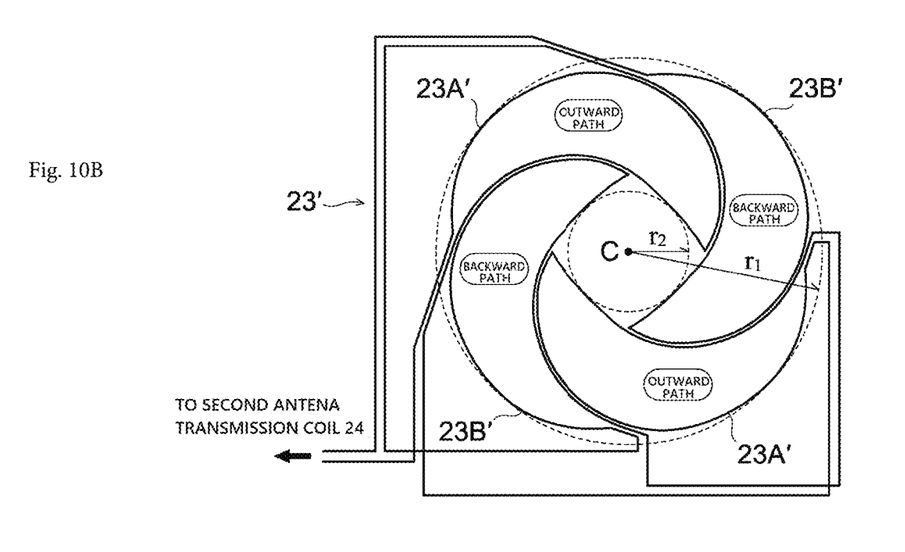
FIG. 10B is a schematic circuit diagram illustrating a structure of a detection coil as a modification.

On the other hand, the shape of the second detection coil 23' of the rotor 2 disposed to face this is formed in a petal shape as illustrated in FIG. 10B. The second detection coil 23' in FIG. 10B is formed in a shape in which an outward coil 23A' and a backward coil 23B' are linked. Even in such a structure, the area S of the portion where the second excitation coil 21' and the second detection coil 23' overlap changes into a sinusoidal shape as the rotor 2 rotates when viewed in the axial direction of the resolver 1. Therefore, actions and effects similar to those of the above embodiment can be obtained, and a good signal waveform can be realized with a simple configuration.

In the above embodiments and modifications, the area S of the portion where the annular region and the petal-shaped region overlap changes into a sinusoidal shape with the rotation of the rotor 2. However, specific shapes of the excitation coil and the detection coil for forming the overlapping portion are not limited to the annular shape and the petal shape. For example, even when the inner diameter of the second detection coil 23 in the above embodiment is reduced or the outer diameter is increased, the area of the overlapping portion does not change, and a good signal waveform can be realized. Therefore, the outline shape of the inner diameter may be a polygon smaller than the inner circle having the radius $r_2$, or the outline shape of the outer diameter may be a polygon larger than the outer circle having the radius $r_1$. By setting the area S of the portion where at least the second excitation coils 21, 22 and the second detection coil 23 overlap so as to change into a sinusoidal shape with the rotation of the rotor 2, it is possible to acquire the identical actions and effects as those of the above embodiment.

2. Second Embodiment

Figure 11:
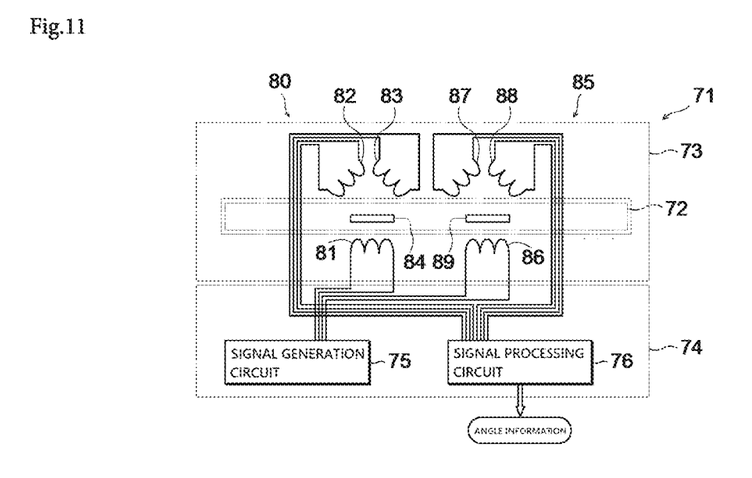
FIG. 11 is a schematic diagram illustrating a structure of a resolver according to the first embodiment.

FIG. 11 is a schematic view illustrating a structure of the resolver 71 according to the second embodiment. The resolver 71 is a single-phase excitation two-phase output resolver 71, and is an inductive resolver (inductive sensor) that receives the AC signal and detects the rotation angle from the amplitude-modulated signal. The resolver 71 includes a rotor 72 (rotor), a stator 73 (stator), and a control device 74. The rotor 72 is a disk-shaped member rotatably supported by the stator 73. The stator 73 is a disk-shaped member fixed to a casing (not illustrated). The stator 73 is provided with excitation coils 81 and 86 and detection coils 82, 83, 87, and 88. On the other hand, the rotor 72 is not provided with a coil, but is provided with thin-film conductors 84 and 89.

The control device 74 calculates and outputs a rotation angle of the rotor 72 with respect to the stator 73. The control device 74 incorporates a signal generation circuit 75 that generates an AC signal supplied to the excitation coils 81 and 86, and a signal processing circuit 76 that outputs angle information corresponding to a rotation angle based on signals returned from the detection coils 82, 83, 87, and 88. The AC signal generated by the signal generation circuit 75 is transmitted to the excitation coils 81 and 86, and a predetermined magnetic field is formed in the stator 73. In response to this, eddy currents flow inside the conductors 84 and 89 of the rotor 72, a magnetic field (diamagnetic field) that cancels the magnetic field of the stator 73 is generated, and the magnetic field is shielded. The positions of the conductors 84 and 89 of the rotor 72 change according to the rotation angle. Therefore, a signal amplitude-modulated according to the rotation angle is returned to the detection coils 82, 83, 87, and 88 of the stator 73. This signal is input to the signal processing circuit 76.

The rotor 72 and the stator 73 of the resolver 71 illustrated in FIG. 11 are provided with a first coil group 80 and a second coil group 85. The first coil group 80 is a coil group including an excitation coil and a detection coil having an axial double angle of nX. On the other hand, the second coil group 85 is a coil group including an excitation coil and a detection coil having an axial double angle of 1X. The first coil group 80 and the second coil group 85 are provided at different positions in the radial direction.

The excitation coils 81 and 86 (first excitation coil 81, second excitation coil 86) are coils that generate an axial magnetic field between the first excitation coil 81 and the second excitation coil 86. The conductors 84 and 89 (first conductor 84, second conductor 89), of the rotor 72, facing the stator 73 in the axial direction receive the magnetic fields of the excitation coils 81 and 86, and generate eddy currents therein to generate a diamagnetic field that cancels the magnetic fields of the excitation coils 81 and 86. For this reason, the conductors 84 and 89 shield part of the magnetic fields of the excitation coils 81 and 86. For example, an AC signal having a predetermined amplitude is input to the excitation coils 81 and 86. The amplitude of the AC signal input to the excitation coils 81 and 86 can be changed by an instruction by the control device 74. Here, the voltage value of the AC signal input to the excitation coils 81 and 86 is expressed as "sin $\omega_{ct}$". $\omega_{ct}$ is an angular velocity of the AC signal.

The detection coils 82, 83, 87, and 88 detect the magnetic fields of the excitation coils 81 and 86. Since the conductors 84 and 89, of the rotor 72, facing each other in the axial direction move in the circumferential direction with the rotation of the rotor 72, a portion where the conductors 84 and 89 shield the magnetic fields of the excitation coils 81 and 86 change according to the rotor angle. Therefore, the magnetic fields detected by the detection coils 82, 83, 87, and 88 also change according to the rotor angle.

The detection coils 82 and 83 of the first coil group 80 include a first sine detection coil 82 and a first cosine detection coil 83. Similarly, the detection coils 87 and 88 of the second coil group 85 include a second sine detection coil 87 and a second cosine detection coil 88. The first sine detection coil 82 and the second sine detection coil 87 detect the sine of the rotor angle, and the first cosine detection coil 83 and the second cosine detection coil 88 detect the cosine of the rotor angle.

The voltage value of the AC signal obtained by the first sine detection coil 82 whose axial double angle is nX is expressed as "sin (n$\theta$)·sin $\omega_{ct}$", and the voltage value of the AC signal obtained by the first cosine detection coil 83 is expressed as "cos (n$\theta$)·sin $\omega_{ct}$" where the rotor angle is $\theta$. Similarly, the voltage value of the AC signal obtained by the second sine detection coil 87 whose axial double angle is 1X is expressed as "sin $\theta$·sin $\omega_{ct}$", and the voltage value of the AC signal obtained by the second cosine detection coil 88 is expressed as "cos $\theta$·sin $\omega_{ct}$". As described above, since the amplitude of the modulated wave obtained by each of the detection coils 82, 83, 87, and 88 changes according to the change in rotor angle, the rotor angle $\theta$ can be identified based on the amplitude. A signal detected by each of the detection coils 82, 83, 87, and 88 is input to the control device 74.

Figure 12A:
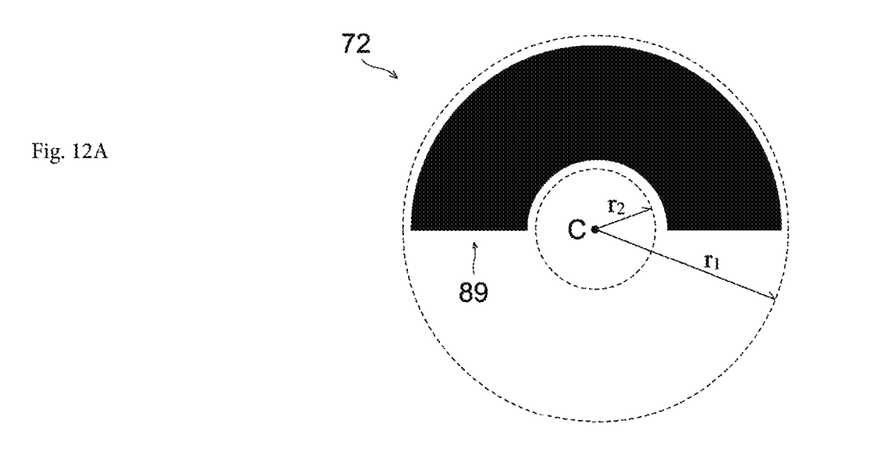
FIG. 12A is a schematic diagram illustrating a structure of a conductor.

The conductors 84 and 89 are formed in shapes in which areas affected by the magnetic fields generated in the excitation coils 81 and 86 change according to the rotation angle of the rotor 72. Specifically, it is formed in a shape (shape in which disk pieces are removed every two disk pieces, and the remaining disk piece is also disposed every two disk pieces) in which the circular ring is divided into many pieces in the circumferential direction and the divided disk pieces are alternately removed along the circumferential direction. The shape of the second conductor 89 illustrated in FIG. 12A is an example of the shape of the conductor in the second coil group 85 having an axial double angle of 1X. The second conductor 89 is formed in a semi-annular shape obtained by dividing an annular ring into two equal pieces in the circumferential direction. The shape of the conductor in the first coil group 80 having the axial double angle of nX is a shape obtained by dividing the annular ring into 2n equal pieces in the circumferential direction and then removing the annular pieces every two pieces in the circumferential direction. Note that the shape of each of the conductors 84 and 89 may not be the "filled shape" as illustrated in FIG. 12A, and may be, for example, a "closed ring shape enclosing only the outer periphery".

Figure 12B:
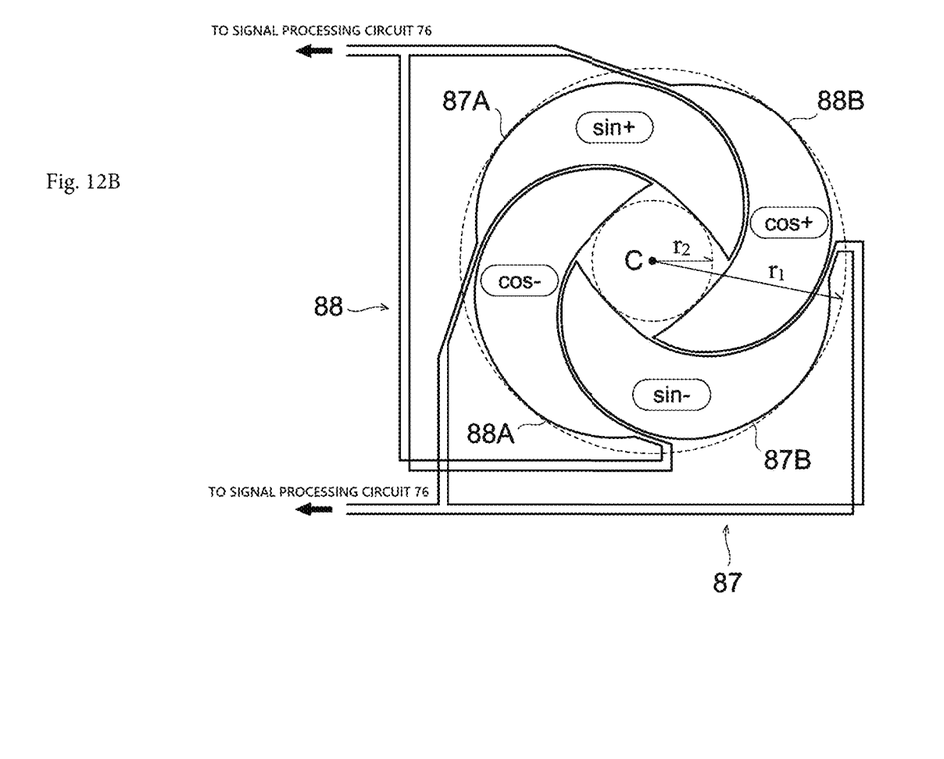
FIG. 12B is a schematic circuit diagram illustrating a structure of a detection coil.

FIG. 12B is a schematic circuit diagram illustrating structures of the second sine detection coil 87 and the second cosine detection coil 88. The second sine detection coil 87 is formed in a shape in which an outward coil 87A [sin+ in FIG. 12B] for generating one of the magnetic pole pair (N pole and S pole) and a backward coil 87B [sin– in FIG. 12B] for generating the other of the magnetic pole pair are linked. The outward coil 87A functions to generate a magnetic flux in a direction opposite to that of the backward coil 87B. In addition, the outward coil 87A and the backward coil 87B are disposed on the identical plane so as not to overlap each other. Similarly, the second cosine detection coil 88 also has the outward coil 88A and the backward coil 88B. The layout of the second sine detection coil 87 and the second cosine detection coil 88 corresponds to the layout of the second sine excitation coil 21 and the second cosine excitation coil 22 in the first embodiment.

Further, when viewed in the axial direction of the resolver 71, the area of a portion where the second sine detection coil 87 and the second cosine detection coil 88 overlap the conductor 89 is set to S. In the second embodiment, the shapes of the second sine detection coil 87, the second cosine detection coil 88, and the conductor 89 are set such that the area S changes into a sinusoidal shape with the rotation of the rotor 72. In other words, the overlapping state of the second sine detection coil 87 and the second cosine detection coil 88 and the conductor 89 is set such that the area S of the overlapping portion changes into a sinusoidal shape with respect to the deflection angle $\theta$ in the polar coordinate plane with the rotation axis C of the rotor 72 as a reference.

With such coil setting, the area of the magnetic flux responsible for signal transmission from the conductor 89 to the detection coils 87 and 88 can be continuously (smoothly) varied, and the waveform of the AC signal generated in the detection coils 87 and 88 can be formed into a smooth curved shape. Therefore, a good signal waveform can be realized with a simple configuration, and the similar effect as that of the above-described embodiment can be obtained. When the coil shapes of the second sine detection coil 87 and the second cosine detection coil 88 are set, coil shapes as illustrated in FIGS. 6A to 6D, 7, and 8 may be applied.

The invention claimed is:

1. A resolver that detects a rotation angle of a rotor with respect to a stator, the resolver comprising:
   a sine coil and a cosine coil that transmit AC signals in which phases of an electrical angle are different from each other by 90 degrees in one of a sheet-like excitation coil and a sheet-like detection coil disposed at the rotor or the stator; and
   a counter coil or a conductor disposed to face the sine coil and the cosine coil in the other of the excitation coil and the detection coil, wherein
   an area of a portion where each of the sine coil and the cosine coil overlap the counter coil or the conductor when viewed in an axial direction of the resolver changes into a sinusoidal shape as the rotor rotates,
   each of the sine coil and the cosine coil has a shape that changes a radial width into a sinusoidal shape with respect to a deflection angle in a polar coordinate plane with a rotation axis of the rotor as a reference,
   each of the sine coil and the cosine coil has a first coil for generating one of a magnetic pole pair and a second coil for generating the other of the magnetic pole pair,
   the first coil and the second coil are disposed on an identical plane so as not to overlap each other, and
   the first coil and the second coil are disposed so as to be adjacent to each other without a gap in a radial direction.

2. The resolver according to claim 1, wherein
   the counter coil is formed in an annular shape coaxial with a rotation axis of the rotor.

3. The resolver according to claim 1, wherein
the excitation coil and the detection coil are both provided at the stator, and
the rotor includes a conductor that generates a diamagnetic field in a direction of canceling a magnetic field of the excitation coil with a magnitude according to the rotation angle.

4. The resolver according to claim 1, wherein
the excitation coil and the detection coil are disposed to face the rotor and the stator.

5. The resolver according to claim 1, wherein
each of the first coil and the second coil is formed in a circular pattern, and
when a clockwise current flows in the first coil, a counterclockwise current flows in the second coil.

6. A resolver that detects a rotation angle of a rotor with respect to a stator, the resolver comprising:
a sine coil and a cosine coil that transmit AC signals in which phases of an electrical angle are different from each other by 90 degrees in one of a sheet-like excitation coil and a sheet-like detection coil disposed at the rotor or the stator; and
a counter coil or a conductor disposed to face the sine coil and the cosine coil in the other of the excitation coil and the detection coil, wherein
an area of a portion where each of the sine coil and the cosine coil overlap the counter coil or the conductor when viewed in an axial direction of the resolver changes into a sinusoidal shape as the rotor rotates,
each of the sine coil and the cosine coil has a shape that changes a radial width into a sinusoidal shape with respect to a deflection angle in a polar coordinate plane with a rotation axis of the rotor as a reference, and
each of the sine coil and the cosine coil is formed in a shape corresponding to a region surrounded by a curve expressed by Expressions 1 and 2 in a polar coordinate plane with a rotation axis of the rotor as a reference

[Math 1]

$$r = (R_1 - R_2)\left\{\frac{\cos\left(\theta - \frac{3}{4}\pi\right) + 1}{2}\right\} + R_2, \ 0 \leq \theta \leq \pi \quad \text{Expression 1}$$

$$r = (R_1 - R_2)\left\{\frac{\sin\left(\theta - \frac{3}{4}\pi\right) + 1}{2}\right\} + R_2, \ 0 \leq \theta \leq \pi \quad \text{Expression 2}$$

$R_1$: Outer diameter, $R_2$: Inner diameter, r: Distance from origin, $\theta$: Deflection angle.

* * * * *